(12) United States Patent
Ayar

(10) Patent No.: US 12,522,308 B2
(45) Date of Patent: Jan. 13, 2026

(54) MOBILE MOTORCYCLE STAND PLATFORM

(71) Applicant: Tulga Ayar, Old Bridge, NJ (US)

(72) Inventor: Tulga Ayar, Old Bridge, NJ (US)

(*) Notice: Subject to any disclaimer, the term of this patent is extended or adjusted under 35 U.S.C. 154(b) by 251 days.

(21) Appl. No.: 18/477,165

(22) Filed: Sep. 28, 2023

(65) Prior Publication Data

US 2024/0109616 A1    Apr. 4, 2024

Related U.S. Application Data

(60) Provisional application No. 63/411,448, filed on Sep. 29, 2022.

(51) Int. Cl.
*B62H 3/04* (2006.01)

(52) U.S. Cl.
CPC ..................... *B62H 3/04* (2013.01)

(58) Field of Classification Search
CPC .... B62H 3/04; B62H 3/06; B62H 3/00; B62B 3/007; B62B 3/06; B62B 3/0606; B62B 3/0625
See application file for complete search history.

(56) References Cited

U.S. PATENT DOCUMENTS

| | | | |
|---|---|---|---|
| 4,193,582 A | 3/1980 | Neilsen | |
| 4,681,299 A | 7/1987 | Siebert | |
| 5,979,878 A | 11/1999 | Blankenship | |
| 6,095,746 A | 8/2000 | Bergin | |
| 6,186,727 B1 | 2/2001 | Hamilton | |
| 6,488,157 B2 * | 12/2002 | Chen | B66F 3/005 211/20 |
| 6,533,247 B1 | 3/2003 | Dhein | |
| 6,981,694 B2 | 1/2006 | Carnahan | |
| D636,140 S | 4/2011 | Cavanaugh | |
| 8,016,312 B2 | 9/2011 | MacEachern | |
| 8,052,159 B2 | 11/2011 | Chen | |
| 8,602,427 B2 | 12/2013 | Trout | |
| 10,093,368 B2 | 10/2018 | Black et al. | |
| 11,110,950 B2 | 9/2021 | Hurd | |

(Continued)

FOREIGN PATENT DOCUMENTS

WO    WO-2006005970 A1 *  1/2006   ............... B62H 3/04

OTHER PUBLICATIONS

Ducati front rear multi-directional moving stand set—by Dynamoto. Dynamoto. (n.d.). https://dynamotousa.com/products/dynamoto-ducati?currency=USD&utm_medium=cpcutm_source=google&utm_campaign=Google+Shopping&gclid=EAlalQobChMI3pOa6vPKgQMVtc_jBx39sQI7EAQYAiABEgJD0vD_BWE.

*Primary Examiner* — John D Walters
(74) *Attorney, Agent, or Firm* — Dunlap Bennett & Ludwig, PLLC; Anna L. Kinney

(57) ABSTRACT

A mobile motorcycle platform is disclosed. The mobile motorcycle platform includes at least two base bars, with a main crossbar extending between the at least two base bars. A middle portion of each of the at least two base bars includes a pair of substantially u-shaped supports extending upwards therefrom. A support crossbar extends between the at least two base bars proximal to the respective pairs of substantially u-shaped supports on each of the at least two base bars, with the u-shaped supports being able to receive and hold a motorcycle stand. At least one wheel is attached to each of the least two base bars. Each wheel may include a brake attached thereto, with the brake being able to lock the motorcycle platform into position.

10 Claims, 3 Drawing Sheets

(56) References Cited

U.S. PATENT DOCUMENTS

| | | |
|---|---|---|
| 2006/0045685 A1 | 3/2006 | Warner et al. |
| 2006/0163543 A1* | 7/2006 | Kobacker, II ........... B66F 15/00 254/131 |
| 2008/0023415 A1 | 1/2008 | Zuckerman |
| 2018/0057325 A1 | 3/2018 | Olson |

* cited by examiner

MOBILE MOTORCYCLE STAND PLATFORM

CROSS-REFERENCE TO RELATED APPLICATION

This application claims the benefit of priority of U.S. provisional application No. 63/411,448, filed Sep. 29, 2022, the contents of which are herein incorporated by reference.

BACKGROUND OF THE INVENTION

The present invention relates to vehicle stands and, more particularly, to a mobile platform to that allows motorcycle stands to be moved rotationally and horizontally.

Motorcycles are a popular means of transportation all around the world. These motorcycles need to be serviced at regular intervals, and many motorcycle owners prefer to work on their bikes by themselves. However, proper motorcycle maintenance and care often requires the motorcycle to be lifted off the ground. Further, many motorcycle owners have minimal space to work on their motorcycle and must move or reposition the bicycle numerous times when performing maintenance. Motorcycles are heavy and difficult to move, leading many owners to drop their motorcycles during maintenance. These drops can cause damage to the motorcycle, damage to or destruction of nearby objects, and damage to flooring.

Conventional motorcycle stands are typically large, expensive, and stationary. Conventional motorcycle stands cannot be moved freely in any direction. They also typically do not allow the motorcycle to be repositioned during maintenance. This lack of mobility hinders owners' ability to properly maintain their bikes.

As can be seen, there is a need for a motorcycle stand that allows a motorcycle to be freely moved and repositioned. The present invention solves these issues by providing a motorcycle platform with a wheeled base. The motorcycle platforms may be attached to a motorcycle stand such that the motorcycle platform then allows the motorcycle stand to be freely moved horizontally and rotated about a center of the motorcycle platform. The present invention thus provides users with the ability to move the motorcycle stand in any desired direction and to rotate the motorcycle stand through a full 360 degrees. The present invention thus allows a motorcycle to be repositioned and moved whenever needed to allow a user to properly maintain and repair a motorcycle.

SUMMARY OF THE INVENTION

In one aspect of the present invention, a mobile motorcycle platform for securely holding a motorcycle and motorcycle stand aloft is provided. The mobile motorcycle platform comprises at least two base bars, wherein each base bar includes a substantially horizontal low portion, a substantially horizontal first upper portion, and a substantially horizontal second upper portion; a main crossbar extending horizontally between and connecting the at least two base bars; a pair of substantially u-shaped supports extending upwardly from a middle portion of each of the at least two base bars; and at least one wheel attached to an underside of each of the least two base bars, wherein each wheel freely pivots through a full 360 degrees about a vertical wheel axis such that the mobile motorcycle platform is movable in all horizontal directions and rotatable about a center of the mobile motorcycle platform.

In another aspect of the present invention, the mobile motorcycle platform includes a first wheel attached to an underside of a free end of the first upper portion of each of the at least two base bars and a second wheel attached to an underside of a free end of the second upper portion of each of the at least two base bars.

In another aspect of the present invention, the motorcycle platform further includes each of the first wheel and second wheel being configured to extend below a bottommost surface of the lower portion of each of the at least two base bars.

In another aspect of the present invention, the motorcycle platform further includes each of the first wheel and second wheel having a brake attached thereto, wherein the brake is configured to lock the rotation of the respective first or second wheel about a central horizontal wheel axis.

In another aspect of the present invention, the mobile motorcycle platform further includes the first upper portion of each of the at least two bars being connected to a first end of the respective low portion via a first vertical extension, and the second upper portion of each of the at least two bars being connected to a second end of the respective low portion via a second vertical extension.

In another aspect of the present invention, the motorcycle platform further includes the main crossbar extending substantially orthogonally relative to each base bar.

In another aspect of the present invention, the motorcycle platform further includes the main crossbar connecting to each of the at least two base bars adjacent a junction of the low portion and first vertical extension.

In another aspect of the present invention, the motorcycle platform further includes a support crossbar extending between and connecting to each of the at least two bars proximal to each pair of u-shaped supports.

In another aspect of the present invention, the motorcycle platform further includes the support crossbar having a smaller cross-sectional area than the lower portion of each of the at least two bars.

In another aspect of the present invention, the motorcycle platform further includes each of the pair of u-shaped supports extending upwardly from opposing sides of the respective base bar adjacent a top edge of the respective base bar.

These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a mobile motorcycle platform having a wheeled base. The platform includes at least two base bars, with a main crossbar extending between the at least two base bars. A middle portion of each of the at least two base bars includes a pair of substantially u-shaped supports extending upwards therefrom. A support crossbar extends between the at least two base bars proximal to the respective pairs of substantially u-shaped supports on each of the at least two base bars, with the u-shaped supports being configured to receive and hold a motorcycle stand. At least one wheel is attached to each of the least two base bars. Each wheel may include a brake attached thereto, wherein the brake is configured to lock the motorcycle platform into position.

The present invention is thus capable of supporting and holding a motorcycle stand such that the motorcycle stand may be moved in all horizontal directions and rotated through a full 360 degrees about a center of the motorcycle platform as needed.

It should be noted that the material of manufacture for the present invention is not particularly limited. For example, the base bars may be formed of a metal, composite, or other similarly strong and durable material that is capable of supporting and moving the weight of a motorcycle.

It should also be noted that the method of manufacture for the present invention is not particularly limited. For example, the base bars may be formed by casting, welding, molding, additive manufacturing, or other similar conventionally known techniques.

Figure 1:
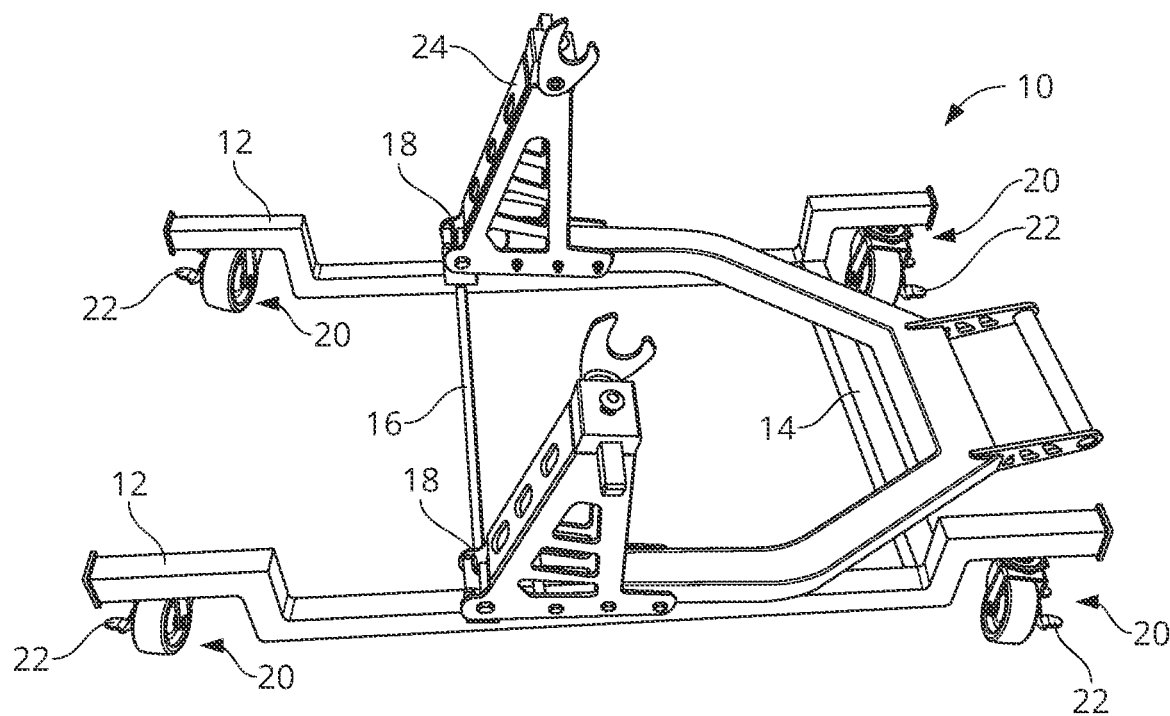
FIG. 1 is a perspective view of an embodiment of a mobile motorcycle platform, shown in use, in accordance with the present invention.
Figure 2:
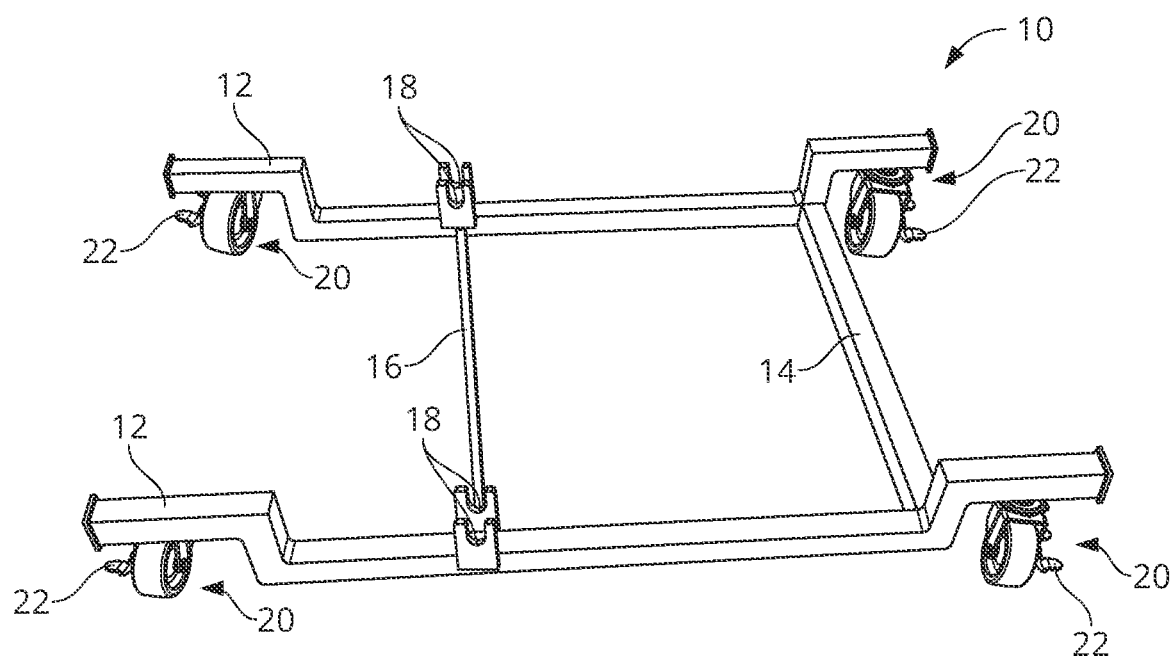
FIG. 2 is a another perspective view thereof.
Figure 3:
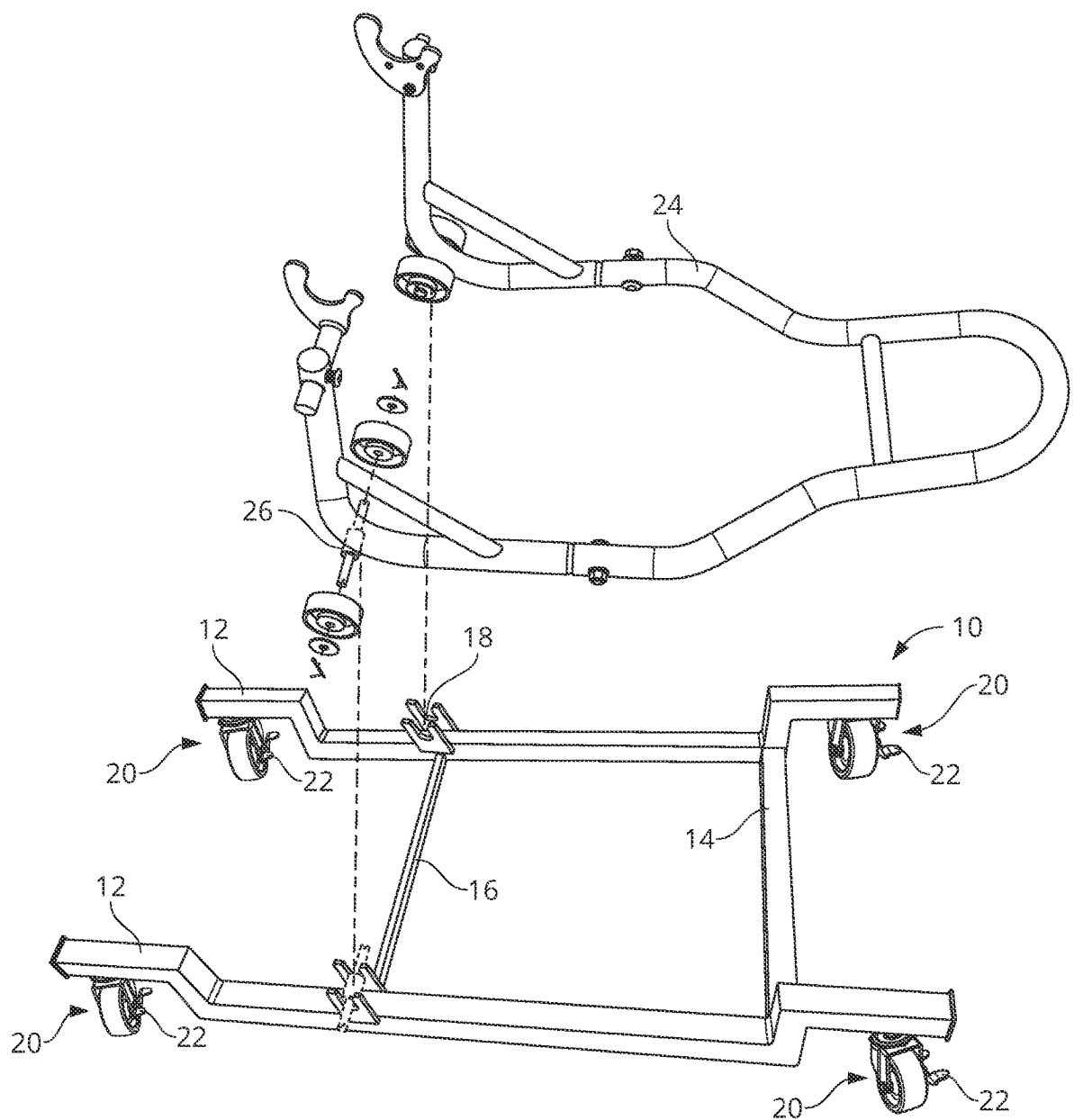
FIG. 3 is an exploded view thereof, showing how a motorcycle stand connects with the mobile motorcycle platform.
Figure 4A:
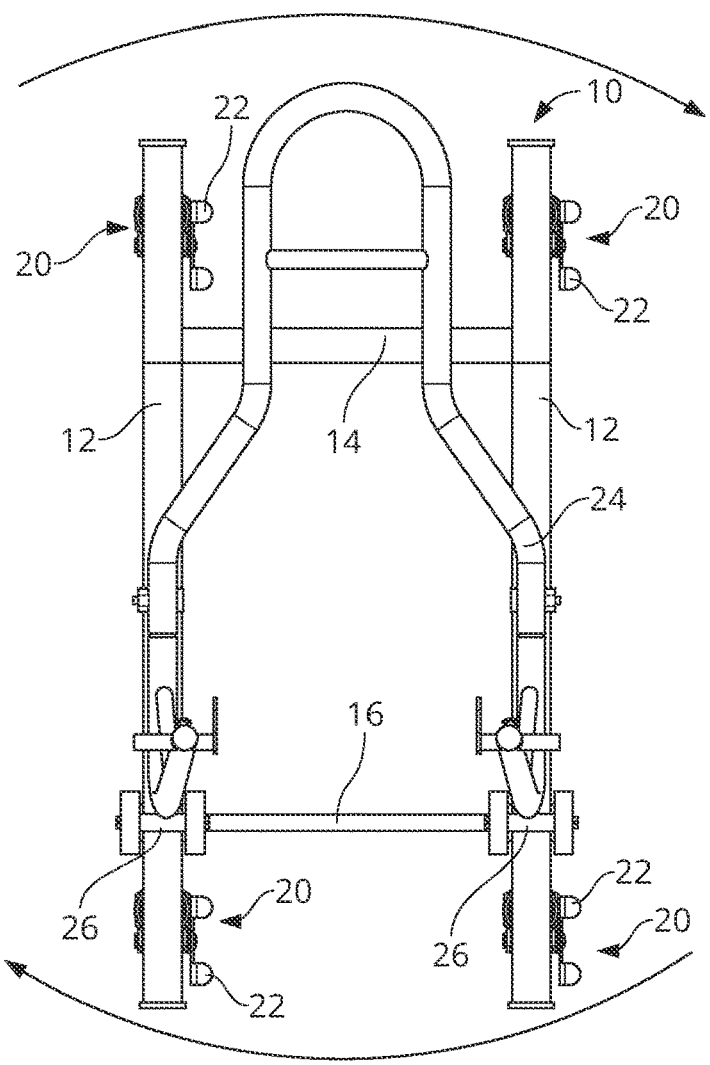
FIG. 4a and FIG. 4b are top views thereof, showing the rotatability of the mobile motorcycle platform.
Figure 4B:
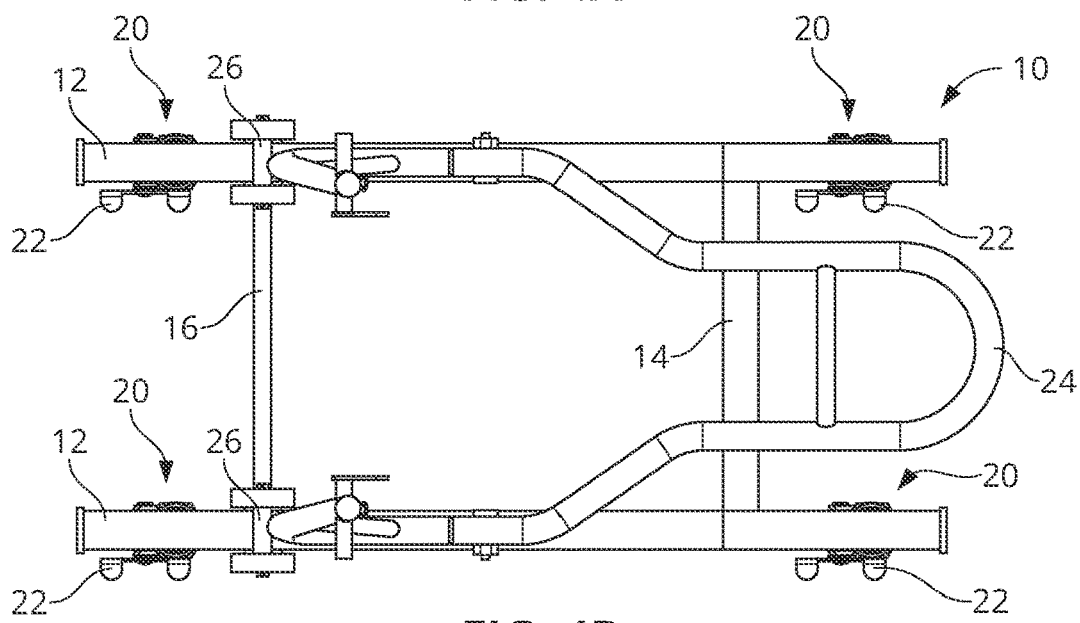

Referring to FIGS. 1-4, embodiments of a mobile motorcycle platform 10 in accordance with the present invention are shown. The mobile motorcycle platform 10 includes at least two base bars 12. Each base bar 12 includes a substantially horizontal low portion, a substantially horizontal first upper portion, and a substantially horizontal second upper portion. The first upper portion is connected to a first end of the low portion via a first vertical extension, and the second upper portion is connected to a second end of the low portion via a second vertical extension. In preferred embodiments, the vertical extensions are integrally formed with the lower portion, first upper portion, and second upper portion. The low portion, first upper portion and second upper portion preferably extend in in a same direction such that each base bar 12 extends in a single plane.

A main crossbar 14 extends horizontally between and connects the at least two base bars 12, with the main crossbar 14 extending substantially orthogonally relative to each base bar 12. In some embodiments, the main crossbar 14 extends between respective junctions of a low portion and first vertical extension of each base bar 12. Further, the main crossbar 14 may be integrally or separately formed with each base bar 12, and the main crossbar 14 may have a substantially similar cross-sectional profile as each base bar 12. In some embodiments, the main crossbar 14 may support a portion of a motorcycle stand 24 when the motorcycle stand 24 is pivoted into a position to hold a motorcycle aloft.

A middle portion of each of the at least two base bars 12 includes a pair of substantially u-shaped supports 18 extending upwards therefrom. In some embodiments, the pair of u-shaped supports 18 extend upwards from opposing sides of the respective base bar 12 adjacent a top edge of the respective base bar 12. A support crossbar 16 extends between and connects the at least two base bars 12 proximal to the respective pairs of substantially u-shaped supports 18 on each of the at least two base bars 12. In some embodiments, the support crossbar 16 has a smaller cross-sectional area than the lower portion of the at least two base bars 12. The pairs of substantially u-shaped supports 18 are configured to receive, hold, and support a motorcycle stand 24. In some embodiments, the u-shaped supports 18 are configured to receive, hold, and support a pivot point, such as a stand axle 26, of the motorcycle stand 24 such that the motorcycle stand 24 may be pivoted upon the pairs of u-shaped supports 18 to raise or lower a motorcycle when the motorcycle is engaged with the motorcycle stand 24.

At least one wheel 20 is attached to each of the least two base bars 12. In some embodiments, each of the at least two base bars 12 includes a first wheel 20 attached to an underside of a free end of the first upper portion and a second wheel 20 attached to an underside of a free end of the second upper portion. Each wheel 20 is configured to extend beyond the bottommost surface of the lower portion of each of the at least two base bars 12 so that when all of the wheels 20 contact substantially horizontal flooring or ground the lower portion makes no contact with horizontal flooring or ground. Each wheel 20 is configured to freely rotate about a central wheel axis to allow the mobile platform 10 to be moved horizontally. Further, each wheel 20 is configured to rotate freely about a vertical wheel axis such that each wheel 20 may be rotated in any desired direction so that the mobile platform 10 may be moved in any desired horizontal direction or so that the mobile platform 10 may itself be rotated. In addition, each wheel 20 may include a brake 22 attached thereto, wherein the brake 22 is configured to lock the rotation of the respective wheel 20 about the respective wheel's central wheel axis. The mobile motorcycle platform 10 is thus able to be locked into a desired position or location.

The present invention is thus able to provide a stable, secure, and robust mobile motorcycle platform upon which motorcycles can be lifted and maintained. The mobile motorcycle platform allows an operator to move the mobile platform into any desired position with minimal effort, thereby reducing the potential for damage being done to the motorcycle, flooring, or other nearby objects.

It should be understood, of course, that the foregoing relates to exemplary embodiments of the invention and that modifications may be made without departing from the spirit and scope of the invention as set forth in the following claims.

What is claimed is:

1. A mobile motorcycle platform for securely holding a motorcycle and motorcycle stand aloft, the mobile motorcycle platform comprising:
    at least two base bars, wherein each base bar includes a substantially horizontal low portion, a substantially horizontal first upper portion, and a substantially horizontal second upper portion;
    a main crossbar extending horizontally between and connecting the at least two base bars;
    a pair of substantially u-shaped supports extending upwardly from a middle portion of each of the at least two base bars; and
    at least one wheel attached to an underside of each of the at least two base bars, wherein each wheel freely pivots through a full 360 degrees about a vertical wheel axis such that the mobile motorcycle platform is movable in all horizontal directions and rotatable about a center of the mobile motorcycle platform.

2. The mobile motorcycle platform of claim 1, wherein the at least one wheel includes a first wheel attached to an underside of a free end of the first upper portion of each of the at least two base bars and a second wheel attached to an underside of a free end of the second upper portion of each of the at least two base bars.

3. The motorcycle platform of claim 2, wherein each of the first wheel and second wheel is configured to extend below a bottommost surface of the lower portion of each of the at least two base bars.

4. The motorcycle platform of claim 3, wherein the main crossbar extends substantially orthogonally relative to each base bar.

5. The motorcycle platform of claim 4, wherein the support crossbar has a smaller cross-sectional area than the lower portion of each of the at least two bars.

6. The motorcycle platform of claim 2, wherein each of the first wheel and second wheel includes a brake attached thereto, wherein the brake is configured to lock the rotation of the respective first or second wheel about a central horizontal wheel axis.

7. The motorcycle platform of claim 6, wherein the main crossbar connects to each of the at least two base bars adjacent a junction of the low portion and the first vertical extension.

8. The mobile motorcycle platform of claim 1, wherein the first upper portion of each of the at least two bars is connected to a first end of the respective low portion via a first vertical extension, and the second upper portion of each of the at least two bars is connected to a second end of the respective low portion via a second vertical extension.

9. The motorcycle platform of claim 8, wherein a support crossbar extends between and connects to each of the at least two bars proximal to each pair of u-shaped supports.

10. The motorcycle platform of claim 1, wherein each of the pair of u-shaped supports extend upwardly from opposing sides of the respective base bar adjacent a top edge of the respective base bar.

* * * * *